July 19, 1938.  W. B. THIEMANN  2,123,975
TRACTOR CONSTRUCTION
Filed Nov. 16, 1935  2 Sheets-Sheet 1
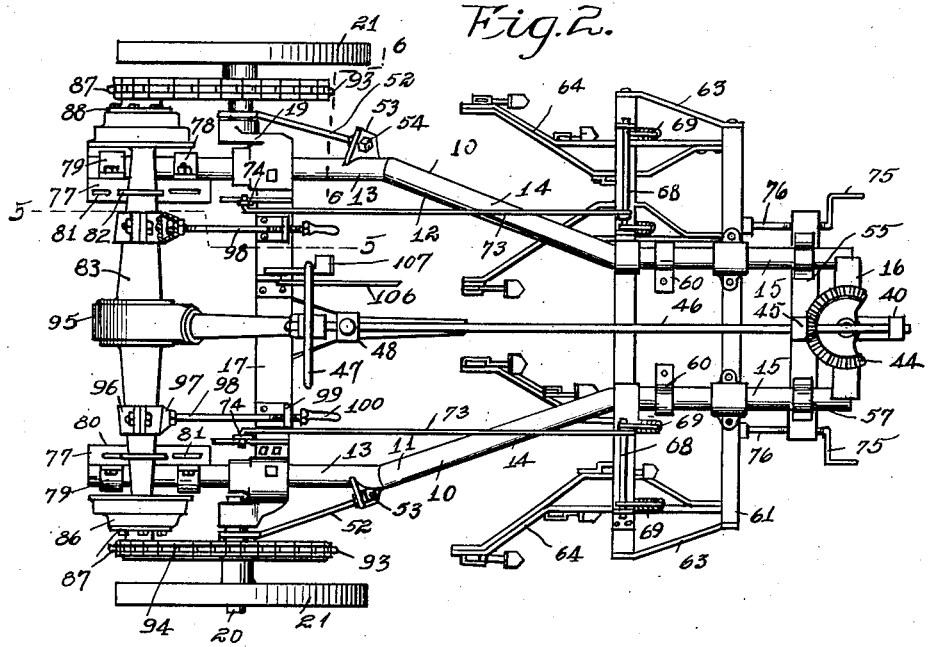
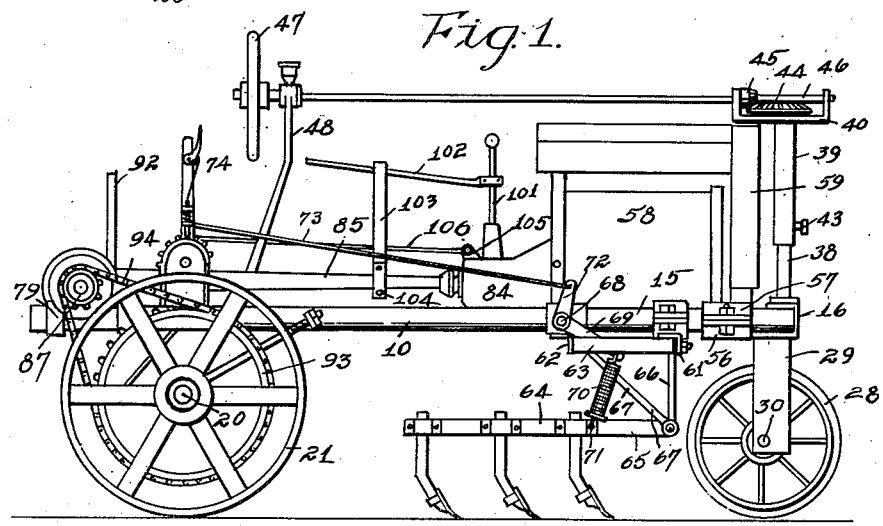
Inventor
William B. Thiemann July 19, 1938.  W. B. THIEMANN  2,123,975
TRACTOR CONSTRUCTION
Filed Nov. 16, 1935  2 Sheets-Sheet 2

Inventor
William B. Thiemann
by Orwig & Hague Atty's

Patented July 19, 1938

2,123,975

UNITED STATES PATENT OFFICE 2,123,975

TRACTOR CONSTRUCTION

William B. Thiemann, Albert City, Iowa

Application November 16, 1935, Serial No. 50,233

12 Claims. (Cl. 180—72)

This invention relates to that class of tractors so constructed that the power and transmission mechanism of a used and discarded or wrecked automobile may be utilized as a power and transmission mechanism in connection with specially constructed tractor frames and running gears.

More specifically, it is the object of my invention to provide an improved tractor frame and running gear construction wherein various types of used and worn automobile engines and corresponding parts may be easily and quickly applied to the tractor frame for furnishing power to propel the tractor.

A further object of my invention is to provide in a tractor frame of the type above described, means for shifting the weight of the power and transmission mechanism longitudinally of the tractor frame, whereby the tendency of the front end of the tractor frame to be elevated as power is applied to the traction wheels may be counterbalanced to meet various load conditions, so that only weight necessary to accomplish steering of the tractor need be carried by the steering wheels and whereby a maximum weight may be applied to the traction wheels without increasing the total weight of the tractor.

A further object of my invention is to provide an improved adjustable steering mechanism wherein various types of engines may be used on the tractor frame and wherein the hand controlled steering wheel of said steering mechanism may be shifted transversely of the frame to accommodate the operator at various seated or standing positions.

A further object is to provide an improved hitch and draw bar construction wherein the steering of the tractor may be more easily and efficiently accomplished with a minimum load carried by the steering wheels.

A further object is to provide in that type of tractor above described in which the rear axle and differential housing, together with the axles carried thereby, are utilized as power transmitting mechanism and wherein the traction wheels are connected with shafts carried by said housing, by means of sprockets and chains, improved means for alining the sprocket carried by the tractor wheel with the sprocket carried by the axles, to overcome disalinement between said sprockets due to wear in the wheel and axle bearings.

A further object of my invention is to provide in a tractor of the type above described, improved means for adjustably mounting a cultivator attachment or other farm implement to said tractor frame.

My invention consists in the construction, arrangement and combination of the various parts of the device, whereby the objects contemplated are attained, as hereinafter more fully set forth, pointed out in my claims, and illustrated in the accompanying drawings, in which:

Figure 1 is a side elevation of my improved tractor frame showing the manner in which an automobile engine, the transmission gear mechanism, the rear axle housing and other accessories are applied thereto for power purposes, and the manner in which a cultivator attachment may be applied to said tractor frame.

Figure 2 is a plan view of my improved tractor frame with the engine removed for the purpose of more clearly illustrating the cultivator attachment construction.

Figure 6:
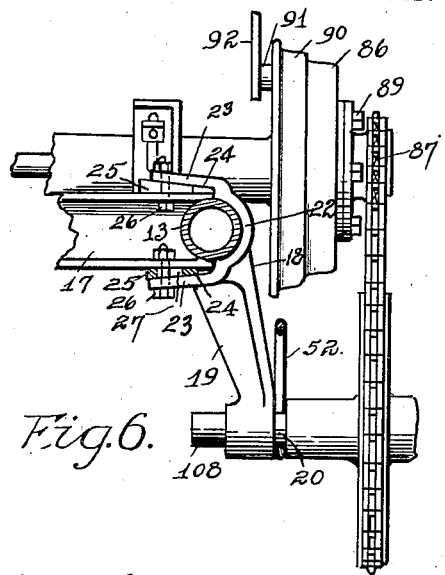
Figure 6 is an enlarged detail sectional view taken on the line 6—6 of Figure 2.
Figure 4:
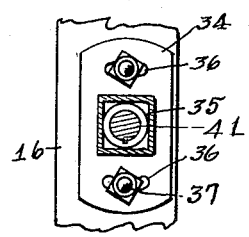
Figure 4 is a detail sectional view taken on the line 4—4 of Figure 3.

Referring to the accompanying drawings I have used the reference numeral 10 to indicate the tractor frame, said frame comprising a pair of tubular members 11 and 12, having parallel portions 13 at their rear end and inwardly inclined intermediate portions 14 terminating in parallel forward end portions 15, the forward end portions 15 being rigidly secured to a transversely arranged channel bar 16 by inserting the forward ends of the members 15 between the parallel flanges of said channel and welding the adjoining adjacent ends of said members together. The members 13 are welded to a transversely arranged frame member 17, the ends of the frame member 17 being cut to fit the tubular members 13, as illustrated in Figure 6, the adjoining portions being welded together. By this arrangement a rigid frame member is provided, with the channel 17 supported intermediate the ends of the members 13.

For supporting the members 13 I have provided wheel brackets 18 having downwardly and rearwardly extending portions 19, the lower ends of said brackets 18 having stub axles 20 on which the traction wheels 21 are rotatably mounted. The upper ends of the brackets 18 are provided with enlarged portions 22 and openings for receiving the tubular members 13, so that the said brackets are both rotatably and slidably mounted on said members 13, the enlarged portions 22 being provided with inwardly extending flanges 23 for receiving between them the frame member 17 as illustrated in Figure 6. The under surfaces of said flanges 23 are inclined with respect to the adjacent flanges of the member 17 so that wedge shaped spaces 24 are provided between the member 17 and said flanges. Wedges 25 are mounted in said spaces so that the angles of the brackets 18 may be varied relative to a vertical line running through the center of the members 13, simply by moving one of the wedges 25 inwardly and the other one outwardly, or vice versa, thus providing means for adjusting the horizontal alinement of the axles 20. Bolts 26 are provided for locking the wedges in their adjusted positions, said bolts passing through slots 27 in said wedges and through the flanges 23 and the flanges of the member 17.

Figure 3:
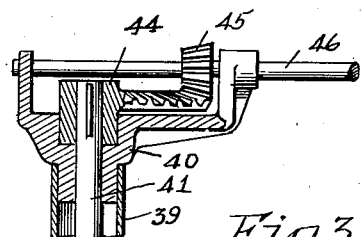
Figure 3 is an enlarged detail vertical sectional view of the steering column and the mechanism supported therein for steering the front tractor wheel.

The front end of the frame 10 is supported by means of a steering wheel 28 supported in a wheel fork 29 by means of an axle bolt 30. The upper end of the fork 29 is fixed to a vertically arranged pipe 31 having its lower end passing through the upper end of said fork and through a reenforcing plate 32, said plate being secured in position by welding. The tubular member 31 is mounted in openings 33 of the flanges of the channel 16, as illustrated in Figure 3.

Supported on the upper surface of the channel 16 is a plate 34 having an opening 35, said plate being rotatably mounted on the upper end of the member 31, the ends of the plate 34 being provided with slots 36 for receiving bolts 37 extending through the upward flange of the member 16. By this arrangement the angle of the plate 34 may be adjusted about the tubular member 31.

Secured to the upper surface of the plate 34 and surrounding the upper end of the tube 31 is a rectangular tube 38 adapted to telescopically receive the lower end of a similar tube 39, the upper end of said tube 39 being mounted to the gear bracket 40.

Rotatably mounted in the bracket 40 is a shaft 41 extending downwardly through the members 38 and 39 and through the tubular member 31. A key 42 is provided for fixing the lower end of the shaft 41 to the tubular member 31, thereby providing means whereby the shaft 41 and the fork 29 will rotate in unison. By this arrangement it will be seen that the gear bracket frame may be elevated or lowered relative to the upper surface of the frame member 16, the key 42 being set after a proper adjustment has been made. A set screw 43 is provided for locking the members 38 and 39 in position after said adjustment has been made, to support the weight of the member 40.

Secured to the upper end of the shaft 41 is a beveled gear 44 designed to mesh with a pinion 45 supported on a horizontally arranged steering shaft 46 having one end rotatably mounted in the bracket 40. By this arrangement it will be seen that if the shaft 46 is rotated, the shaft 41 will also be rotated by the gear mechanism, which in turn will cause the fork 29 to be rotated.

Figure 8:
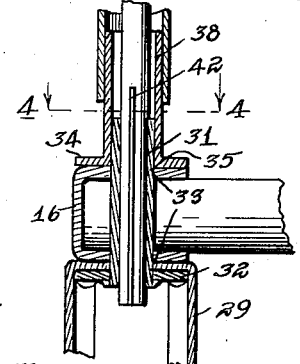
Figure 8 shows the manner in which the column for supporting the horizontal steering shaft is adjustably mounted to accommodate engines of various types.
Figure 5:
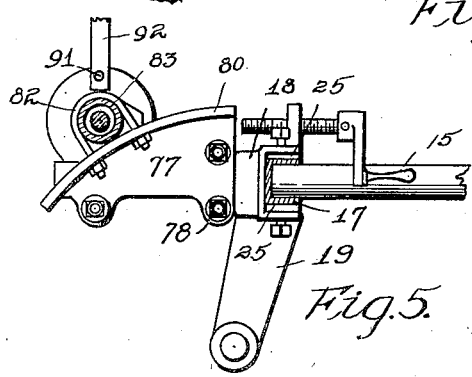
Figure 5 is a detail sectional view taken on the line 5—5 of Figure 2.
Figure 7:
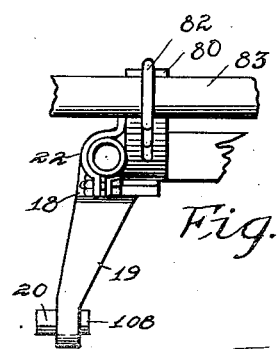
Figure 7 is a detail view illustrating the manner in which the axle supporting bracket is secured to the main frame.

By adjusting the plate 34 on the member 16 it will be seen that the angle of the steering shaft 46 may be adjusted relative to the longitudinal axis of the frame 14, so that the steering wheel 47 carried by the rear end of said shaft 46 will be supported in various transverse positions, which is simply accomplished by moving the bracket 48 supporting the rear end of the shaft 46 longitudinally of the frame member 17 and transversely of the frame members 10, the lower end of the bracket 48 being secured to the member 17 by means of suitable bolts 49, as illustrated in Figure 8, said bolts extending through suitable openings 50 in said frame member 17. The bolts 49 are also mounted in vertically arranged slots 51 at the lower end of the member 48 so as to permit vertical adjustment of the member 48.

The bolt 30 of the fork 29 is supported near the rear edge of the lower end of said bracket, while the tube 31 is supported in the forward edge of the upper end of the fork 29, so that a slight caster effect will be produced to assist in steering the front end of the tractor frame and at the same time permit the steering wheel 28 to be easily swung to an angle of 90°, if so desired, so as to permit the tractor to be turned about one of the tractor wheels 21 as a pivot in the manner hereinafter more fully set forth.

The brackets 18 are reenforced by means of brace rods 52 having their forward ends extending through brackets 53 secured to the forward ends of the members 13, the rear ends of the braces 52 being screw threaded and provided with lock nuts 54.

The frame members 17 are provided with a transversely arranged bar 55 slidably mounted on said members 15 by means of clamps 56 and 57. The bar 55 serves to support the forward end of an automobile engine 58, as well as the radiator 59, said radiator and engine being secured to the bar by means of any suitable brackets, the shape and size of said brackets depending altogether on the type of engine and radiator used. The members 15 are also provided with slidably mounted brackets 60 for supporting the rear end of the engine 58. The members 15 are also provided with slidably mounted frame members 61 and 62 connected together by means of bars 63, the frame members 61 and 62 being designed to support a cultivator mechanism 64 of ordinary construction, said cultivator mechanism including beams 65 having their forward ends pivoted to downwardly extending brackets 66 depending on the frame members 61. Braces 67 are provided between the lower ends of the members 66 and the frame member 62. Supported on top of the outer ends of the frame member 62 are rock shafts 68, having forwardly extending arms 69, to which the beams 65 are connected by means of springs 70 and push rods 71, such as are commonly used in connection with cultivators of this type. The shaft 68 is also provided with an upwardly extending arm 72 to which one end of a rod 73 is connected, the rear end of the rod 73 being connected to an operating lever 74 carried by the frame member 17, thus providing means for elevating and lowering the cultivator beam 65.

The frame members 61 and 62 may be adjusted longitudinally of the members 15 by means of cranks 75 mounted on the forward ends of screw threaded shafts 76 providing means whereby the cultivator device 64, or any other desired cultivator implement supported by the members 61 and 62, may be adjusted longitudinally of said frame member as desired when in operating position.

Slidably mounted on the rear end of each of the frame members 13, by means of bolts 78 and straps 79, is a bracket 77, the upper edge of each of the brackets 77 being curved and the center of which curvature is located at the center of the shaft 20, the said upper edge having an inwardly extending curved flange 80 provided with slots 81 for receiving the U bolts 82 by means of which the axle housing 83 of the automobile unit is secured thereto, said axle housing 83 connecting with the transmission gear case 84 by means of the torsional tube 85, all these parts being simply removed from the automobile frame and placed in position on the tractor frame without alteration.

The automobile wheels are removed from the hub portions 86 and sprocket wheels 87 substituted, the said sprocket wheels being provided with flanges 88 secured to the said hubs by means of suitable bolts 89, the brake mechanism being retained in the brake drums 90, together with the outwardly extending brake actuating shafts 91.

Secured to each of the shafts 91 is an upwardly extending lever 92 by means of which the brake bands may be manually set for steering purposes. Each of the wheels 21 is provided with a large sprocket wheel 93 driven from the sprockets 87 by means of chains 94.

For adjusting the power and transmission elements longitudinally of the frame 10 (which term shall hereinafter be used to refer to the engine 58 and the trasmission gear 84, the tube 85, the axle housing 83 and the differential housing 95 included therein) I have provided the brackets 96 to form clamp devices secured around the axle housing 83, the forward clamp member having a forwardly extending portion 97 for receiving the rear end of a rod 98 rotatably mounted therein, the forward end of the rod 98 being screw threaded into a bracket 99 carried by the frame member 17, the forward end of each of the rods 98 having a crank 100 by means of which said rods 98 may be rotated, which in turn will cause the brackets 96 to be moved toward and from the brackets 99, and in turn the axle housing 83 to be moved longitudinally of the frame 10, carrying with it the torsional tube 85, gear case 84 and engine 58, thus providing means whereby the weight of the power and transmission units may be shifted to counteract or add to the lifting tendency of the forward end of the tractor frame as power is applied thereto, due to the torque set up between the traction wheels and the frame supported thereon.

I have found by actual tests and by actually operating tractors of this type, that it is essential that the weight of the axle housing and differential housing be carried by the rearwardly extending portion of the frame members 13, so as to give the proper counter-balancing effect and prevent excessive weight as applied by the engine and transmission gear mechanism, to the front steering wheel 28, as I have found that this weight is in excess of what is necessary to provide sufficient traction between the wheels 28 and the ground surface for steering the tractor frame, as a large amount of unnecessary power is required to advance the tractor over the ground surface, especially when the tractor is being used on loose soil such as plowed ground, as, when the tractor is being used for cultivating, harrowing and discing purposes.

I have also found that if the weight of the power and transmission units are properly balanced for operating lighter machinery, such as cultivators and discs, that sufficient weight is not provided on the front end when the tractor is utilized for heavier work such as drawing one or more plows, in which case it is desirable to move the entire power and transmission units forwardly. This may be easily accomplished by loosening the clamping members for the brackets 56 and 60 and the U bolts 82, after which the cranks 100 may be operated and the entire unit moved forward. It will readily be seen that as this forward movement takes place the axle housing 83 will climb the curved flange 80 so as to prevent slacking of the chains 94, thus providing means whereby the power and transmission units may be easily and quickly adjusted to balancing positions without making it necessary to remove or add links to the chains 94, as would be the case if the axle 83 were moved parallel to the members 13. The chains 94 may be tightened or loosened by simply sliding the brackets 77 longitudinally of the members 13.

A shift lever 101 and transmission gear is provided with a rearwardly extending rod 102 pivotally mounted on the upper end of a support 103, the lower end of the support 103 being clamped to the torsional tube 85 by a clamp device 104. By this arrangement it will be seen that the rear end of the rod 102 may be grasped and moved longitudinally or laterally to form the desired shifting movements of the lever 101, the rear end of said rod 102 being terminated immediately ahead of the seat, not illustrated. The clutch lever 105 is actuated by means of a rod 106 extending to a foot controlled lever 107 carried by the frame member 17.

Figure 9:
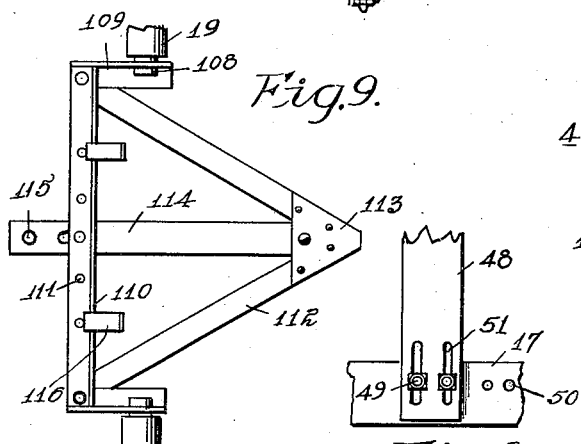
Figure 9 is a plan view of my improved draft and hitch bar construction.

For attaching the tractor to the farm implement I have mounted on inwardly extending portions 108 of the shafts 20 frame members 109 (see Fig. 9) which are connected to the transversely arranged draft beam 110, having openings 111 in which clevis pins may be mounted, if so desired. Secured to the ends of the beam 110 are forwardly and inwardly diverging frame members 112 connected to a plate 113 supported a considerable distance ahead of the axle members 20. Pivotally connected to the plate 113 is a draw bar 114 extending rearwardly beneath the bar 110 and having an opening 115 in its rear end, to which a farm implement such as a harrow or disc may be attached.

The frame is held against rotation about the members 108 by means of braces 116 extending from the bar 111 to the frame member 17.

I have also found by experience that if the weight of the forward end of the tractor frame has been reduced by the counterbalancing effect above referred to so that only sufficient weight is applied to facilitate the steering operation, there is not sufficient lateral attraction to accomplish the steering operation when a heavy implement such as a plow is being drawn by the beam 110, such as is ordinarily provided for in tractors. For that reason the frame members 112 are provided with a portion terminating ahead of the axles 20, to which the draw bar 114 is attached, so that as the tractor is turned, the rear end of the draw bar 114 will move laterally toward one end of the beam 110. The draft of the tractor then tends to assist the turning of the tractor in the desired direction, while if the load is applied to the beam 110 this draft tends to hinder the turning direction of the tractor.

I have also found by actual tests with tractors of the type above described wherein downwardly extending wheel supporting brackets are provided and traction wheels mounted on axles carried thereby, that the said brackets or axles sometimes become slightly bent or strained, or the bearings between the wheel and the axle become worn to such an extent that the sprocket wheels carried by the traction wheels are pulled out of alinement with the sprocket wheels carried by the countershafts. For this reason the wheel brackets 19 are adjustably mounted by means of the wedges 25 so that the sprockets 93 may be properly alined with the sprockets 87.

By making the vertical steering column adjustable I have provided means whereby the steering shaft 46 may be elevated and lowered to accommodate engines of different heights, so that the steering shaft may always be supported close to the upper surface of said engine to make a more compact structure. By rotating the plate 34 about the tube 31 the steering wheel 47 may be mounted at various lateral positions above the frame member 17. It is sometimes desirable that the operator place the seat near one end of the frame member 17 so that the operator will be in alinement with one of the rows of plants being cultivated when a two row cultivator is being operated.

Thus it will be seen I have provided a tractor frame construction so arranged that any one of a number of standard automobile engines and transmission mechanism may be applied to the tractor frame and thus enable the operator to utilize an automobile engine for traction purposes, which might otherwise be thrown away or discarded, and to enable the operator to obtain cheaper power for agricultural purposes. The tractor above described is a great deal lighter than the ordinary farm tractor and particularly adapted for light farm work, this tractor being easily steered about one traction wheel as a pivot center by first swinging the steering wheel in position at right angles to the frame and grasping one of the levers 92 and applying the brake to the drum connected with the sprocket wheel, which in turn is operatively connected to a pivot wheel, thus holding said pivot wheel against rotation while the power from the tractor is applied to the opposite traction wheel to swing the tractor into steering position.

I claim as my invention:

1. In a device of the class described, the combination of a supporting frame; a steering wheel supporting the front end of said frame; traction wheels supporting the rear end of said frame at points intermediate its front and rear ends; means for steering the front supporting wheel; power and power transmitting units supported by said frame, including an engine, transmission gear devices, a drive shaft, rear axle and differential housing; means for mounting said power and power transmitting units to move longitudinally of said frame with the axle and differential housing at the rear of the axles of said traction wheels, means for adjusting said units longitudinally of said frame whereby the weight of said axle and differential housing will counterbalance a portion of the weight of the front end of said tractor frame.

2. In a device of the class described, the combination of a tractor frame; a steering wheel; traction wheels; sprocket wheels carried by said traction wheels; a power unit; means for transmitting power from said power unit to said traction wheels, including the rear axle and differential housing assembly of an automobile and sprocket pinions substituted for the wheels thereof; means for moving the power unit and said rear axle housing assembly longitudinally of said main frame for balancing purposes; chains connecting the wheel sprockets with their corresponding sprocket pinions; and means for guiding the sprocket pinions at a pre-determined distance from the center of said traction wheels as the power unit and the axle housing and differential assembly are adjusted longitudinally of said frame.

3. In a device of the class described, the combination of a tractor frame, a steering wheel; traction wheels; sprocket wheels carried by said traction wheels; a power unit; means for transmitting power from said power unit to said traction wheels, including the rear axle and differential housing assembly of an automobile and sprocket pinions substituted for the wheels thereof; means for moving the power unit and said rear axle housing assembly longitudinally of said main frame for balancing purposes; chains connecting the wheel sprockets with their corresponding sprocket pinions; means for guiding the sprocket pinions at a pre-determined distance from the center of said traction wheels as the power unit and the axle housing and differential assembly are adjusted longitudinally of said frame; and means for adjusting the alinement of said wheel sprockets relative to their corresponding sprocket pinions.

4. In a device of the class described, a tractor frame having rearwardly extending members; a power unit including an axle housing supported on said frame; wheel brackets extending downwardly from said frame; axles carried by said brackets; traction wheels mounted on said axles; arcuate brackets mounted on the rearwardly extending frame members; means for adjustably mounting said axle housing on the arcuate portions of said brackets to move circumferentially thereof; an axle within said housing; means operatively connecting said axle and said traction wheels; and means for moving said axle housing and power unit longitudinally of said frame.

5. In a device of the class described, a tractor frame having rearwardly extending members; a power unit including an axle housing supported on said frame; wheel brackets extending downwardly from said frame; axles carried by said brackets; traction wheels mounted on said axles; arcuate brackets mounted on the rearwardly extending frame members; means for adjustably mounting said axle housing on the arcuate portions of said brackets to move circumferentially thereof; an axle within said housing; means operatively connecting said axle and said traction wheels; means for moving said axle housing and power unit longitudinally of said frame; and means for adjusting said brackets longitudinally of said frame members.

6. In a device of the class described, a tractor frame; steering and traction wheels supporting said frame; a power unit carried by said tractor frame; power transmission means for operatively connecting said power unit with the traction wheels; an implement frame slidably mounted on said tractor frame; means for adjusting said implement frame longitudinally of the tractor frame; means for adjustably mounting the power unit and power transmitting mechanism to move longitudinally of said tractor frame; and means for imparting longitudinal movement to the last said unit.

7. In a device of the class described, the combination of a tractor frame, steering and traction wheels, a power unit, power transmission mechanism for imparting power from said power unit to said traction wheels, means for mounting said power unit and power transmission mechanism to move longitudinally of said frame for balancing purposes, and means for operatively connecting said power transmission mechanism to said traction wheels when the power transmission mechanism is in any of its adjusted positions of movement.

8. In a device of the class described, a frame, a shaft rotatably mounted on said frame, sprocket pinions carried by said shaft, wheel brackets pivoted to said frame and depending therefrom, axles carried by said brackets, traction wheels on said axles, a sprocket wheel on each tractor wheel, a chain operatively connecting each sprocket wheel and its respective sprocket pinion, said brackets having inwardly projecting lugs above and below said frame, and wedges between said lugs and said frame whereby the depending end of said brackets may be adjusted laterally to align said sprocket wheels with said sprocket pinions.

9. In a device of the class described, a frame, a shaft rotatably mounted on said frame, sprocket pinions carried by said shaft, wheel brackets pivoted to said frame and depending therefrom, axles carried by said brackets, traction wheels on said axles, a sprocket wheel on each traction wheel, a chain operatively connecting each sprocket wheel and its respective pinion, and means for adjusting the depending ends of said brackets laterally to align said sprocket wheels and said sprocket pinions.

10. In a device of the class described, a tractor frame, steering and traction wheels supporting said frame, a power unit carried by said tractor frame, power transmission means for operatively connecting said power unit with the traction wheels, an implement frame slidably mounted on said tractor frame, and means for adjustably mounting the power unit and power transmitting mechanism to move longitudinally of said tractor frame.

11. In a device of the class described, a tractor frame, steering and traction wheels supporting said frame, a power unit carried by said tractor frame, power transmission means for operatively connecting said power unit with the traction wheels, an implement frame slidably mounted on said tractor frame, means for adjusting said implement frame longitudinally of the tractor frame, and means for adjustably mounting the power unit and power transmitting mechanism to move longitudinally of said tractor frame.

12. In a device of the class described, a tractor frame including tubular side members, a steering wheel, traction wheels, an implement supporting frame, a power unit, means for transmitting power from said power unit to said traction wheels, including the rear axle and differential housing assembly of an automobile with the wheels removed, means for transmitting power from the ends of said axles to said traction wheels, and means for supporting said implement frame and power unit assembly to move longitudinally and independently of each other on said frame, with the axle and differential housing supported rearwardly of the axis of the traction wheels, said supporting means including circumferential clamp devices slidably mounted on said tubular frame members, for supporting and locking said units in any one of their adjusted positions of movement, for the purpose stated.

WILLIAM B. THIEMANN.